United States Patent
Choi et al.

(10) Patent No.: US 10,210,654 B2
(45) Date of Patent: Feb. 19, 2019

(54) STEREO 3D NAVIGATION APPARATUS AND SALIENCY-GUIDED CAMERA PARAMETER CONTROL METHOD THEREOF

(71) Applicant: INDUSTRY ACADEMY COOPERATION FOUNDATION OF SEJONG UNIVERSITY, Seoul (KR)

(72) Inventors: Soo Mi Choi, Seoul (KR); Yeo Jin Yoon, Seoul (KR); Tae Hoon Cho, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 15/211,509

(22) Filed: Jul. 15, 2016

(65) Prior Publication Data

US 2017/0206702 A1    Jul. 20, 2017

(30) Foreign Application Priority Data

Jan. 15, 2016 (KR) .................. 10-2016-0005232
Feb. 22, 2016 (KR) .................. 10-2016-0020762

(51) Int. Cl.
| | |
|---|---|
| *G06T 15/20* | (2011.01) |
| *G06T 5/00* | (2006.01) |
| *G06T 5/50* | (2006.01) |
| *G06T 7/00* | (2017.01) |
| *G06T 15/04* | (2011.01) |

(Continued)

(52) U.S. Cl.
CPC ............ *G06T 15/20* (2013.01); *G06T 5/002* (2013.01); *G06T 5/50* (2013.01); *G06T 7/0081* (2013.01); *G06T 15/04* (2013.01); *H04N 13/117* (2018.05); *H04N 13/128* (2018.05); *H04N 13/144* (2018.05); *G06T 2207/10012* (2013.01); *G06T 2207/20224* (2013.01); *H04N 2213/002* (2013.01)

(58) Field of Classification Search
None
See application file for complete search history.

(56) References Cited

U.S. PATENT DOCUMENTS

2018/0081908 A1* 3/2018 Matsubara ........ G06F 17/30259

FOREIGN PATENT DOCUMENTS

| KR | 10-1428384 B1 | 8/2014 |
|---|---|---|
| KR | 101428384 B1 * | 8/2014 |
| KR | 10-1520293 B1 | 5/2015 |

OTHER PUBLICATIONS

Lee, Sungkil, Gerard Jounghyun Kim, and Seungmoon Choi. "Real-time tracking of visually attended objects in virtual environments and its application to LOD." IEEE Transactions on Visualization and Computer Graphics 15.1 (2009): 6-19.*

(Continued)

*Primary Examiner* — Yi Wang
(74) *Attorney, Agent, or Firm* — Hauptman Ham, LLP

(57) ABSTRACT

Disclosed are a stereo 3D navigation apparatus and a saliency-based camera parameter control method for the same. An embodiment of the invention provides a camera parameter control method for navigation that includes: (a) detecting a candidate zone of high visual attention by way of saliency analysis on a navigation scene; and (b) changing the location of the virtual screen to the candidate zone.

4 Claims, 4 Drawing Sheets

(51) Int. Cl.
*H04N 13/117* (2018.01)
*H04N 13/144* (2018.01)
*H04N 13/128* (2018.01)

(56) References Cited

OTHER PUBLICATIONS

Korean Office Action dated Jan. 17, 2017 in connection with the counterpart Korean Patent Application No. 10-2016-0020762.
Jung-Min Hwang et al., "Saliency-based Stereoscopic 3D Parameter Control", Journal of the Korea Computer Graphics Society, Jul. 16, 2015.

* cited by examiner

STEREO 3D NAVIGATION APPARATUS AND SALIENCY-GUIDED CAMERA PARAMETER CONTROL METHOD THEREOF

CROSS-REFERENCE TO RELATED APPLICATIONS

This application claims the benefit of Korean Patent Application No. 10-2016-0005232, filed with the Korean Intellectual Property Office on Jan. 15, 2016, and Korean Patent Application No. 10-2016-0020762, filed with the Korean Intellectual Property Office on Feb. 22, 2016. The disclosures of the above applications are incorporated herein by reference in their entirety.

BACKGROUND

1. Technical Field

The present invention relates to a stereo 3D navigation apparatus and a saliency-based camera parameter control method for the same.

2. Description of the Related Art

With recent advances in stereoscopic virtual reality equipment such as Oculus Rift, much attention is being focused on rendering methods related to stereoscopic visualization. However, mismatches between person's eyes and rendered images can cause visual fatigue accompanied by headaches, dizziness, nausea. As such, research is underway in various fields aiming to resolve this problem. An existing method for reducing visual fatigue may involve defining a visual comfort zone, in which a person may comfortably perceive a rendering, and controlling the parameters of the virtual cameras such that the scenes can be formed within the visual comfort zone, for instance by adjusting the distance between the virtual cameras and adjusting the depth of the virtual screen. However, besides camera parameters, other factors inherent in the scenes, such as color, textural patterns, etc., can also cause visual discomfort during a stereoscopic visualization process. This type of problem is associated with the visual perception characteristics of persons, and thus is difficult to resolve simply by changing the camera parameters. Existing techniques that take account such perceptual characteristics may include, for example, a method of extracting a saliency map from a 2-dimensional image and positioning places of high visual attentive objects in a zero parallax region based on the saliency map, and a method of using a head-mounted display to track the line of sight and positioning the places of most frequent viewing in a zero parallax region based on the tracking. With the present invention, information on an object of a high level of visual attention is detected by considering low-level saliency and high-level saliency in a 3-dimensional virtual space; where the low-level saliency is based on color and texture, and the high-level saliency relates to independent object information within the scene. This method, while utilizing aspects of existing methods for controlling the parameters of a virtual camera, makes it possible to change the parameters of the camera such that an object of high visual attention is located at a position of zero parallax, to thereby reduce factors causing visual discomfort, to levels unachievable with existing methods.

SUMMARY OF THE INVENTION

An aspect of the invention is to provide a stereo 3D navigation apparatus and a saliency-guided camera parameter control method that can reduce visual fatigue by detecting an area of high visual attention based on saliency and changing the virtual screen such that the area of high visual attention is located at a position of zero parallax.

Another aspect of the invention is to provide a stereo 3D navigation apparatus and a saliency-guided camera parameter control method that can maintain the sense of 3-dimensionality and depth in a stereoscopic 3D scene by controlling the parameters of the virtual cameras within a visual comfort zone, which is a zone in which the rendering provides visually comfortable viewing.

One aspect of the present invention provides a saliency-guided camera parameter control method for a stereo 3D navigation apparatus that can reduce visual fatigue by detecting an area of high visual attention based on saliency and changing the virtual screen such that the area of high visual attention is located at a position of zero parallax.

An embodiment of the invention provides a saliency-guided camera parameter control method for navigation that includes: (a) detecting a candidate zone of high visual attention by way of saliency analysis on a navigation scene; and (b) changing the location of the virtual screen to the candidate zone.

Step (a) may include: obtaining an image having modified visual attention by way of saliency analysis on a 2D image of the navigation scene; generating a difference image between the 2D image and the obtained image; and extracting the candidate zone of high visual attention in the navigation scene by performing an erosion operation and a dilation operation on the difference image.

Obtaining the modified image may include: obtaining an n-level hardware mipmap images from the 2D image; obtaining an m-level conspicuity maps by way of a difference operation on the n number of mipmap images; and generating an m-level modulation maps by using the m-level conspicuity maps, where n and m are natural numbers.

Extracting the candidate zone can be performed by adding the modulation values at a portion corresponding to a focus area in the 2D image and subtracting the modulation values from the original image at other areas, to thereby extract the candidate zone.

Step (a) can include detecting a final candidate zone by applying a high-level saliency constraint that considers a context of a scene on the candidate zone.

The saliency constraint that considers the context of the scene may include information on an important object in the scene.

Step (b) may include applying preset camera parameters so that the location of the virtual screen is unchanged, if the candidate zone is determined not to be an important object upon considering a high-level saliency constraint.

Step (b) can include: determining a candidate zone closest to the cameras as a final candidate zone, if there are more than one of the candidate zones; and changing the location of the virtual screen by adjusting the camera parameters based on the 3-dimensional coordinates of the final candidate zone.

Step (b) can include: calculating an anti-distortion parameter associated with preventing distortion from adjusting the location of the virtual screen to the candidate zone; and adjusting the location of the virtual screen such that the anti-distortion parameter does not exceed a set value.

Another aspect of the invention provides a 3-dimensional virtual space navigation apparatus that can reduce visual fatigue by detecting an area of high visual attention based on saliency and changing the virtual screen such that the area of high visual attention is located at a position of zero parallax.

One embodiment of the present invention can provide a stereo 3D navigation apparatus that includes: a candidate zone detection unit, which may be configured to detect a candidate zone of high visual attention by way of saliency analysis on a navigation scene; and a parameter adjustment unit, which may be configured to change the location of the virtual screen to the candidate zone.

The candidate zone detection unit can obtain an image having modified visual attention by way of saliency analysis on a 2D image of the navigation scene, generate a difference image between the 2D image and the obtained image; and perform an erosion operation and a dilation operation on the generated difference image to extract the candidate zone of high visual attention in the navigation scene.

The parameter adjustment unit can apply preset camera parameters so that the location of the virtual screen is unchanged, if the candidate zone is determined not to be an important object upon considering a high-level saliency constraint.

The parameter adjustment unit can determine a candidate zone closest to the cameras as a final candidate zone, if there are more than one of the candidate zones, and can change the location of the virtual screen by adjusting the camera parameters based on the 3-dimensional coordinates of the final candidate zone.

The parameter adjustment unit can calculate an anti-distortion parameter associated with preventing distortion from adjusting the location of the virtual screen to the candidate zone, and can adjust the location of the virtual screen such that the calculated anti-distortion parameter does not exceed a set value.

By detecting an area of high visual attention based on saliency and then changing the virtual screen such that the area of high visual attention is located at a position of zero parallax, a stereo 3D navigation apparatus and a saliency-guided camera parameter control method for the stereo 3D navigation apparatus according to an embodiment of the present invention can provide the advantage of reducing visual fatigue.

Also, an embodiment of the present invention can control the parameters of the virtual cameras within a visual comfort zone, which is a zone in which the rendering provides visually comfortable viewing, to thereby maintain the sense of 3-dimensionality and depth in a stereoscopic 3D scene.

Additional aspects and advantages of the present invention will be set forth in part in the description which follows, and in part will be obvious from the description, or may be learned by practice of the invention.

DETAILED DESCRIPTION OF THE INVENTION

In the present specification, an expression used in the singular encompasses the expression of the plural, unless it has a clearly different meaning in the context. In the present specification, terms such as "comprising" or "including," etc., should not be interpreted as meaning that all of the elements or steps are necessarily included. That is, some of the elements or steps may not be included, while other additional elements or steps may be further included. Also, terms such as "unit" or "module," etc., refers to a unit subject that processes at least one function or action, and such unit subject can be implemented as hardware or software or a combination of hardware and software.

Certain embodiments of the present invention are described below in more detail with reference to the accompanying drawings.

Figure 1:
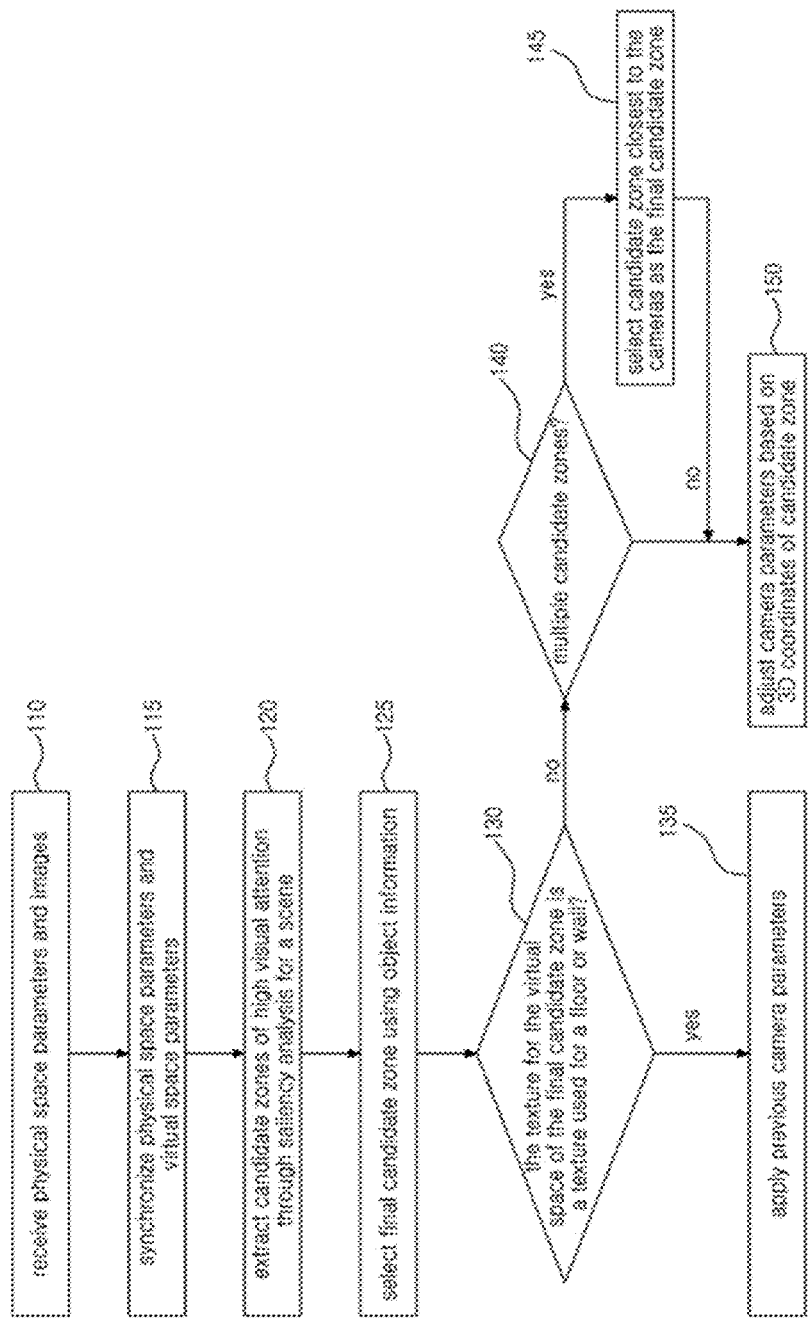
FIG. 1 is a flowchart illustrating a method of navigating a 3-dimensional virtual space according to an embodiment of the present invention.
Figure 2:
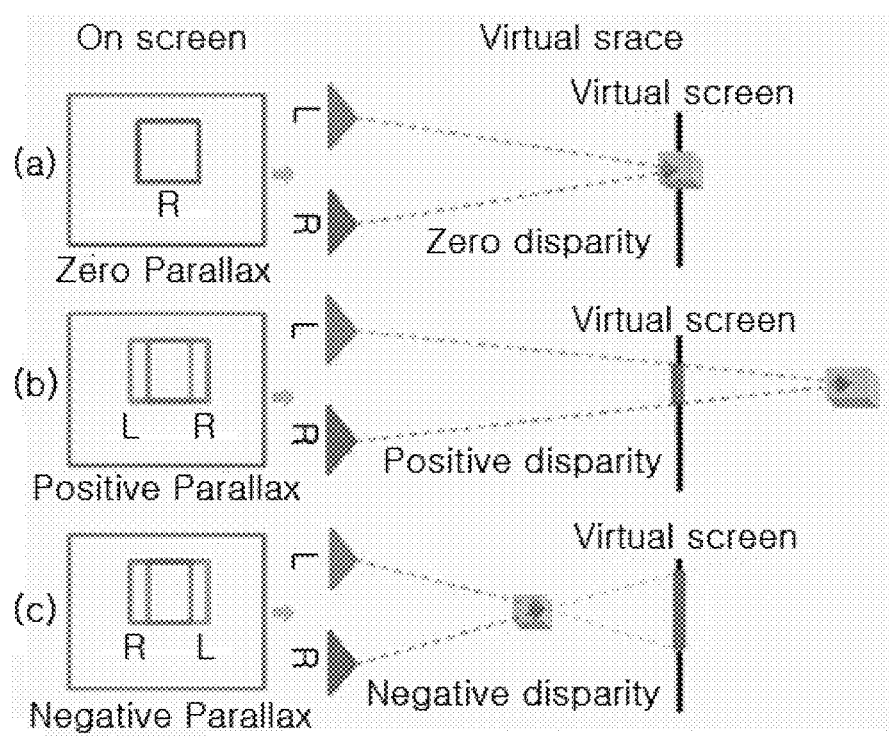
FIG. 2 illustrates the parallax associated with the depth of an object according to an embodiment of the present invention.
Figure 3:
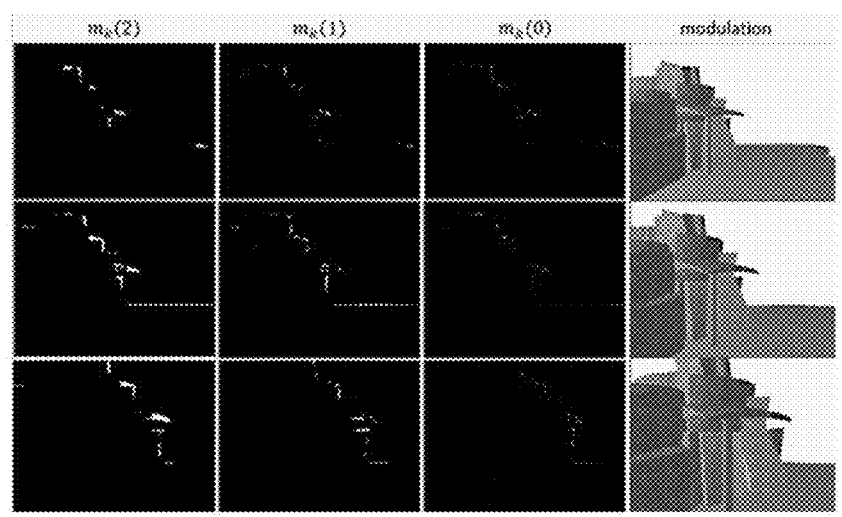
FIG. 3 illustrates the results of applying a modulation map to an original image according to an embodiment of the present invention.
Figure 4:
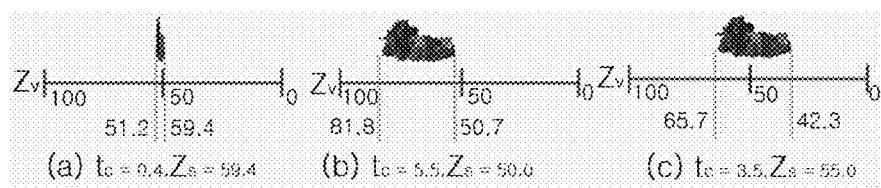
FIG. 4 illustrates the results of changing the location of the virtual screen based on a saliency zone according to an embodiment of the present invention.

FIG. 1 is a flowchart illustrating a method of navigating a 3-dimensional virtual space according to an embodiment of the present invention, FIG. 2 illustrates the parallax associated with the depth of an object according to an embodiment of the present invention, FIG. 3 illustrates the results of applying a modulation maps to an original image according to an embodiment of the present invention, and FIG. 4 illustrates the results of changing the location of the virtual screen based on a saliency zone according to an embodiment of the present invention.

In step 110, the stereo 3D navigation apparatus 100 may be inputted with physical space parameters and images. Here, the physical parameters can include the position of the user, the size of the display, and the like.

The images can be 2D images for each scene used in the navigation.

In step 115, the stereo 3D navigation apparatus 100 may match the inputted physical space parameters with virtual space parameters.

In a stereoscopic 3D scene, the measured parallax may be different in the projected screens depending on the depth of an object. Referring to FIG. 2 for a brief illustration, when an object is at the same depth as the virtual screen, the left image and the right image may be completely identical (drawing (a) of FIG. 2) as with a mono image, but the observer would not sense a 3-dimensional stereoscopic effect.

However, if an object is located within the virtual space at a position behind the virtual screen, as in drawing (b) of FIG. 2, the observer would feel as if the object in the projected scene is located behind the display.

Also, if an object is located within the virtual space at a position in front of the virtual screen, as in drawing (c) of FIG. 2, the observer would perceive the object in the projected scene as having a negative parallax and protruding in front of the display.

By having the parameters of the physical space and the virtual space synchronized, a parameter in one space can be changed in the same way that the parameter in the other space is adjusted.

Therefore, the stereo 3D navigation apparatus 100 may match the inputted physical parameters with the parameters of the virtual space.

For example, the stereo 3D navigation apparatus 100 can obtain the physically perceived observed depth by using Equation 1.

$$Z_P = Z_D t_e / (t_e - P)$$ [Equation 1]

Here, $Z_P$ represents the perceived depth, $Z_D$ represents the distance between the observer and the display, P represents the screen parallax, and $t_e$ represents the distance between a person's left and right eyes.

In an embodiment of the invention, the distance between the left and right eyes may be fixed to 6.5, the adult average.

The screen parallax P can be calculated by using parallax d, which may be computed from Equation 2.

$$d = t_c/w_s(1-Z_s/Z)$$ [Equation 2]

Here, $t_c$ represents the distance between the virtual cameras, $w_s$ represents the width of the virtual screen, $Z_s$ represents the depth of the virtual screen, and Z represents the depth of the object.

$$P = \frac{w_s \times d}{2.0}$$ [Equation 3]

The parallax d calculated by Equation 2 is parallax using the OpenGL unit measurements of the virtual space. To acquire the screen parallax P, the parallax d of the virtual space may be converted to the physical space. For this procedure, the normalized device coordinates (NDC), having the range of [−1, 1], and the display width of the physical space may be used.

Since the parallax d in the virtual space exists in a hexahedral space of unit length 2.0 in the normalized coordinates, the physical parallax (screen parallax) P used in Equation 3 can be readily acquired using a proportional equation.

Accordingly, the parameters of actual physical space and of the virtual space can be unified, making it possible to adjust a scene in consideration of the position of the user, the size of the display, and the distance between the display and the user.

Therefore, by using Equation 1 and Equation 2, the observed depth $Z_P$ can be changed by adjusting the distance $t_c$ between the virtual cameras and the depth $Z_s$ of the virtual screen, so that the occurrence of visual discomfort can be tracked in real time.

Thus, the stereo 3D navigation apparatus 100 can synchronize the parameters of the physical space with the parameters of the virtual space.

Next, in step 120, the stereo 3D navigation apparatus 100 may, by way of saliency analysis performed on a scene, extract zones in which the visual attention is high (hereinafter referred to as candidate zones).

When adjusting the parameters of the virtual cameras, if an object is very close to the cameras, the depth of the virtual screen may be set close to the virtual cameras to maintain visual comfort. In this case, other objects forming the scene would all be located behind the virtual screen, leaving the observer to perceive depth only and unable to perceive 3-dimensionality. Because of this, the observer may not feel as immersed as in real life.

Therefore, in an embodiment of the present invention, zones of high visual attention in a scene can be detected through saliency analysis, after which the location of the virtual screen can be positioned to a zone having high visual attention detected thus, in order that the sense of 3-dimensionality may be maintained for the scene.

A description is provided below on the method of extracting a candidate zone having a high visual attention based on saliency analysis. Here, a candidate zone having high visual attention can be a part having a distinguished color and can be extracted, for example, using color, textural patterns, etc.

In an embodiment of the invention, a candidate zone can be extracted considering both low-level saliency and high-level saliency.

That is, low-level saliency analysis can be performed on the image to extract multiple saliency zones (candidate zones), and then the final candidate zone can be extracted by using high-level saliency information to exclude zones having low conspicuity.

To be more specific, the stereo 3D navigation apparatus 100 may receive input of 2D image for a navigation scene and may obtain n-level hardware mipmap images from the 2D image. Here, n may be a natural number.

Then, the stereo 3D navigation apparatus 100 may generate a conspicuity map through a difference operation on the n-level hardware mipmap images. In generating the conspicuity map, the stereo 3D navigation apparatus 100 can use an existing method of saliency analysis and control, such as that proposed by Veas et al. The saliency analysis and control method proposed by Veas et al. utilizes center-surround difference.

The stereo 3D navigation apparatus 100 can generate a k-level conspicuity maps through a difference operation on a-level mipmap images. Here, a may be a natural number.

The conspicuity map can be obtained from the most detailed level to the least detailed level, where a higher level represents a conspicuity map of a less detailed level.

The stereo 3D navigation apparatus 100 can generate a conspicuity map of each level by using Equation 4.

$$C_k = \frac{\sum_{n=0}^{n=2} \sum_{m=n+3}^{m=n+4} k_n - k_{n+m}}{P}$$ [Equation 4]

Here, k represents the conspicuity level, while n and m represent the levels of the image pyramid, respectively. Also, P represents the total number of levels of the image pyramid, fixed to 6 in an embodiment of the invention.

After thus computing the conspicuity maps, the stereo 3D navigation apparatus 100 may generate modulation maps for extracting low-level saliency zones (i.e. candidate zones) by using the conspicuity maps.

For example, the conspicuity map of each level may be divided into focus areas and context zones according to the difference operation results.

For example, areas having the top 10% highest values in the conspicuity map of each level can be considered focus areas.

For example, the stereo 3D navigation apparatus 100 can generate the modulation maps by using Equation 5.

$$m_k = \begin{cases} 0 & c_k < t_k \\ c_k - t_k & \text{otherwise} \end{cases}$$ [Equation 5]

Here, $t_k$ represents a threshold value. $t_k$ can be set by averaging the values of the focus areas.

With the conspicuity maps thus generated, the stereo 3D navigation apparatus 100 may apply the conspicuity maps to the 2D images (i.e. original images) for a navigation scene to extract the low-level saliency zones (i.e. candidate zones).

For example, the stereo 3D navigation apparatus 100 can extract the low-level saliency zones (i.e. candidate zones) by adding the modulation values at portions corresponding to focus areas in the 2D images (i.e. original images) for a navigation scene and subtracting the modulation values from the original images at other areas.

FIG. 3 illustrates the results of applying modulation maps to an original image.

The process for applying an m number of conspicuity maps to the original images may involve repetitively averaging the results of applying a conspicuity map of a previous level with the results of applying the current level. In this way, the chroma key effect, which may occur when applying a conspicuity map to an original image, can be avoided.

The portions shown in dark colors in the lowermost row of FIG. 3 are the low-level saliency zones (i.e. candidate zones) of the scene.

As low-level saliency is based on the image, there may occur such cases in which a focus area is set at a floor or a wall portion, or such cases in which several different areas are shown as saliency, depending on the structure within the scene as represented by textural pattern, color, contrast, etc.

Therefore, in order to set a meaningful area, such as a door or a sculpture, as saliency, it may be necessary to consider high-level saliency using an object buffer.

Thus, in step 125, the stereo 3D navigation apparatus 100 may select a final candidate zone from among the extracted candidate zones by using object information.

The stereo 3D navigation apparatus 100 can use object information of the virtual space, which corresponds to high-level saliency, to exclude candidate zones having low conspicuity from among the extracted candidate zones, and thereby select the final candidate zone.

To be more specific, the stereo 3D navigation apparatus 100 may backwardly project the coordinates of an extracted candidate zone to extract the 3D coordinates in the virtual space. Then, the stereo 3D navigation apparatus 100 may inspect the object used at the extracted 3D coordinates to inspect whether or not the corresponding candidate zone has an object of high conspicuity.

If the object corresponding to the candidate zone is an object of low conspicuity, such as a ceiling, floor, or wall portion, the stereo 3D navigation apparatus 100 can exclude this candidate zone, and ultimately can select a final candidate zone having a high conspicuity.

The stereo 3D navigation apparatus 100 may store information on a virtual space as object units. With such object information, it is possible to identify objects such as a floor, a wall, and a sculpture within the scene. Therefore, the stereo 3D navigation apparatus 100 can consider a high-level saliency constraint with regard to the candidate zones, by using an object buffer (i.e. object information), to select the final candidate zone.

In 130, the stereo 3D navigation apparatus 100 may determine whether the texture of an object corresponding to the final candidate zone thus selected is a texture used for a floor or wall.

If it is a texture used for a floor or wall, the stereo 3D navigation apparatus 100 in step 135 may render a visually comfortable scene according to an existing camera parameter control method, as there is no need to adjust the camera parameters to an object of high saliency for the final candidate zone.

However, if the texture is not a texture used for a floor or wall, then the stereo 3D navigation apparatus 100 in step 140 may determine whether or not there are more than one final candidate zone.

If there are multiple final candidate zones, then in step 145, the stereo 3D navigation apparatus 100 may select the candidate zone closest to the cameras, from among the multiple candidate zones, as the final candidate zone.

Next, in step 150, the stereo 3D navigation apparatus 100 may adjust the depth of the virtual screen and the camera parameters with respect to the 3D coordinates of the final candidate zone.

Here, as the stereo 3D navigation apparatus 100 adjusts the depth of the virtual screen and the camera parameters, the observed depth can be adjusted, and the frequency of the occurrence of visual discomfort can be tracked in real time. Adjusting the distance $t_c$ between the virtual cameras and the depth $Z_s$ of the virtual screen may cause a distortion of the depth of an object.

Therefore, the stereo 3D navigation apparatus 100 can calculate an anti-distortion parameter, associated with preventing distortion from adjusting the distance between the virtual cameras and the depth of the virtual screen, and then consider this parameter in adjusting the distance between the virtual cameras and the depth of the virtual screen.

For example, the stereo 3D navigation apparatus 100 can calculate the anti-distortion parameter by using Equation 6.

$$\mu = \frac{Z_D t_c}{Z_s t_e} \qquad \text{[Equation 6]}$$

For example, in adjusting the distance between the virtual cameras and the depth of the virtual screen, the stereo 3D navigation apparatus 100 can adjust the distance between the virtual cameras and the depth of the virtual screen such that the anti-distortion parameter does not exceed 1.

FIG. 4 illustrates a case in which only the parameters of the virtual cameras are considered, as well as the results of changing the location of the virtual screen based on saliency zones in consideration of an anti-distortion parameter.

In drawing (a) in FIG. 4, it can be seen that, as the scene is rendered considering only the parameters of the virtual cameras, an area is limited to a portion of the virtual space with the perceived depth distorted.

In drawing (b) of FIG. 4, however, an anti-distortion parameter was considered, and it is seen that the object can maintain its perceived depth in the scene without distortion.

In drawing (b) of FIG. 4, it can be seen that the location of the model is generally positioned at the back of the virtual screen. In this case, by changing the virtual screen using saliency, as in drawing (c) of FIG. 4, a stereoscopic 3D space that is visually comfortable can be rendered, providing the user with both a sense of 3-dimensionality and a sense of depth.

Figure 5:
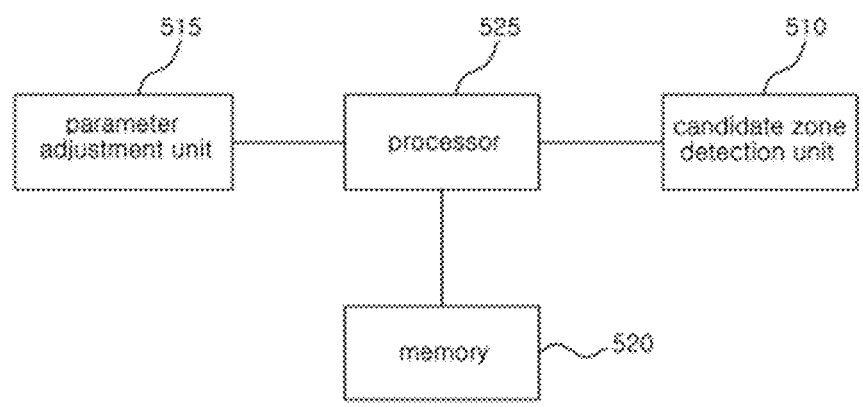
FIG. 5 is a block diagram illustrating the composition of a navigation apparatus according to an embodiment of the present invention.

FIG. 5 is a block diagram illustrating the composition of a stereo 3D navigation apparatus according to an embodiment of the present invention.

Referring to FIG. 5, a stereo 3D navigation apparatus 100 according to an embodiment of the invention may include a candidate zone detection unit 510, a parameter adjustment unit 515, a memory 520, and a processor 525.

The candidate zone detection unit 510 may serve to detect candidate zones of high visual attention through a saliency analysis on the navigation scene.

In detecting the candidate zones of high visual attention, the candidate zone detection unit 510 can detect the candidate zones in consideration of both low-level saliency and high-level saliency.

As this is already described above, redundant descriptions are omitted.

The parameter adjustment unit 515 may serve to adjust the parameters of the virtual space.

For example, when the parameters for a physical space are inputted, the parameter adjustment unit 515 may synchronize the physical space parameters with the parameters for the virtual space.

Then, when a candidate zone for a navigation scene is detected based on visual saliency, the parameter adjustment unit 515 can adjust the camera parameters for the virtual space and the position of the virtual screen based thereon.

In adjusting the camera parameters for the virtual space and the position of the virtual screen, the parameter adjustment unit 515 can adjust the camera parameters and the position of the virtual screen by considering an anti-distortion parameter.

To this end, the parameter adjustment unit 515 can calculate an anti-distortion parameter associated with distortions resulting from adjusting the distance between virtual cameras and the depth of the virtual screen, and can then adjust the distance between virtual cameras and the virtual screen depth such that the anti-distortion parameter does not exceed 1.

The method of calculating the anti-distortion parameter is already described above, and as such, redundant descriptions are omitted.

The memory 520 may serve to store the applications, algorithms, various associated data, and the like, necessary for executing a method of adjusting the location of the virtual screen to a zone having high visual attention in a navigation scene based on visual saliency according to an embodiment of the invention.

The processor 525 may serve to control the various internal components (e.g. the candidate zone detection unit 510, parameter adjustment unit 515, memory 520, etc.) of a stereo 3D navigation apparatus 100 according to an embodiment of the invention.

The elements in the embodiments described above can be easily understood from the viewpoint of processes. That is, each element can be understood as a respective process. Likewise, the processes described above can also be easily understood from the viewpoint of components of an apparatus.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed for illustrative purposes. Those of ordinary skill in the art to which the present invention pertains would understand that various modifications, alterations, and additions can be made without departing from the spirit and scope of the invention, and that such modifications, alterations, and additions are encompassed by the scope of claims defined below.

What is claimed is:

1. A saliency-guided camera parameter control method for stereo three-dimensional (3D) navigation, the saliency-guided camera parameter control method comprising:

obtaining n-level hardware mipmap images from a 2D image of a navigation scene;

obtaining m-level conspicuity maps by way of image differencing between n number of mipmap images, wherein the m-level conspicuity maps is divided into a focus area and context zones, and the focus area is an area having the top 10% highest value of the image differencing in a conspicuity map of each level among the m-level conspicuity maps;

generating m-level modulation maps by using the focus area set for the m-level conspicuity maps;

extracting a candidate zone by adding modulation values of the m-level modulation maps to the 2D image at a portion corresponding to the focus area in the 2D image and subtracting the modulation values of the m-level modulation maps from the 2D image at other areas in the 2D image;

when one or a plurality of candidate zones is extracted, determining a candidate zone closest to cameras as a final candidate zone;

calculating an anti-distortion parameter associated with preventing distortion from adjusting a location of a virtual screen to the final candidate zone; and changing the location of the virtual screen by adjusting camera parameters based on 3D coordinates of the final candidate zone such that the anti-distortion parameter does not exceed a set value.

2. The saliency-guided camera parameter control method of claim 1, wherein the changing the location of the virtual screen to the candidate zone further comprises:

applying preset camera parameters so that the location of the virtual screen is unchanged, if the extracted candidate zone is determined not to be an object upon considering a saliency constraint.

3. A non-transitory computer-readable storage medium readable by a digital processing device, tangibly embodying a program of instructions executable by the digital processing device to perform a saliency-guided camera parameter control method for stereo three-dimensional (3D) navigation, the method comprising:

obtaining n-level hardware mipmap images from a 2D image of a navigation scene;

obtaining m-level conspicuity maps by way of image differencing between n number of mipmap images, wherein the m-level conspicuity maps is divided into a focus area and context zones, and the focus area is an area having the top 10% highest value of the image differencing in a conspicuity map of each level among the m-level conspicuity maps;

generating m-level modulation maps by using the focus area set for the m-level conspicuity maps;

extracting a candidate zone by adding modulation values of the m-level modulation maps to the 2D image at a portion corresponding to the focus area in the 2D image and subtracting the modulation values of the m-level modulation maps from the 2D image at other areas in the 2D image;

when one or a plurality of candidate zones is extracted, determining a candidate zone closest to cameras as a final candidate zone;

calculating an anti-distortion parameter associated with preventing distortion from adjusting a location of a virtual screen to the final candidate zone; and changing the location of the virtual screen by adjusting camera parameters based on 3D coordinates of the final candidate zone such that the anti-distortion parameter does not exceed a set value.

4. A stereo three-dimensional (3D) navigation apparatus comprising a processor, wherein said processor is configured to:

obtain n-level hardware mipmap images from a 2D image of the navigation scene;

obtain m-level conspicuity maps by way of image differencing between n number of mipmap images, wherein the m-level conspicuity maps is divided into a focus area and context zones and the focus area is an area having the top 10% highest value of the image differencing in a conspicuity map of each level among the m-level conspicuity maps;

generate m-level modulation maps by using the focus area set for the m-level conspicuity maps;

extract a candidate zone by adding modulation values of the m-level modulation maps to the 2D image at a portion corresponding to the focus area in the 2D image and subtracting the modulation values of the m-level modulation maps from the 2D image at other areas in the 2D image;

when one or a plurality of candidate zones is extracted, determine a candidate zone closest to cameras as a final candidate zone;

calculate an anti-distortion parameter associated with preventing distortion from adjusting a location of a virtual screen to the final candidate zone; and change the location of the virtual screen by adjusting camera parameters based on 3D coordinates of the final candidate zone such that the anti-distortion parameter does not exceed a set value.

* * * * *